(12) United States Patent
Chen

(10) Patent No.: US 6,210,738 B1
(45) Date of Patent: Apr. 3, 2001

(54) FREEZE-DRIED GINSENG BERRY TEA

(75) Inventor: Jau-Fei Chen, Orem, UT (US)

(73) Assignee: E Excel Internatioanal Inc., Springville, CT (US)

( * ) Notice: Subject to any disclaimer, the term of this patent is extended or adjusted under 35 U.S.C. 154(b) by 0 days.

(21) Appl. No.: 09/438,806

(22) Filed: Nov. 12, 1999

Related U.S. Application Data

(63) Continuation-in-part of application No. 09/298,806, filed on Apr. 23, 1999, and a continuation-in-part of application No. 09/298,807, filed on Apr. 23, 1999, and a continuation-in-part of application No. 09/298,701, filed on Apr. 23, 1999, and a continuation-in-part of application No. 09/298,703, filed on Apr. 23, 1999.

(51) Int. Cl.⁷ .................. A23L 2/00; A23L 2/56
(52) U.S. Cl. ............... 426/597; 426/93; 426/384; 426/385; 426/590; 426/599; 426/615; 426/638
(58) Field of Search .................. 426/590, 597, 426/599, 638, 615, 384, 385, 93

(56) References Cited

U.S. PATENT DOCUMENTS

| | | | |
|---|---|---|---|
| 3,227,616 | 1/1966 | Heinz-Gunter et al. | 167/91 |
| 4,042,720 | 8/1977 | Forkner | 426/573 |
| 4,078,092 | 3/1978 | Nishiyama | 426/584 |
| 4,276,890 | 7/1981 | Fichera | 131/270 |
| 4,361,554 | 11/1982 | Saunders | 424/180 |
| 4,615,900 | 10/1986 | Schenz et al. | 426/590 |
| 4,732,773 | 3/1988 | Schott | 426/590 |
| 4,737,367 | 4/1988 | Langer et al. | 426/72 |
| 4,784,847 | 11/1988 | Zulliger-Bopp et al. | 424/69 |
| 4,795,638 | 1/1989 | Ayache et al. | 424/195.1 |
| 5,000,949 | 3/1991 | Bias | 424/74 |
| 5,034,226 | 7/1991 | Beck | 424/195.1 |
| 5,171,577 | 12/1992 | Griat et al. | 424/450 |
| 5,230,889 | 7/1993 | Inoue | 424/195.1 |
| 5,290,605 | 3/1994 | Shapira | 424/439 |
| 5,466,455 | 11/1995 | Huffstutler, Jr. et al. | 424/401 |
| 5,470,874 | 11/1995 | Lerner | 514/474 |
| 5,565,199 | 10/1996 | Page et al. | 424/195.1 |
| 5,565,207 | 10/1996 | Kashibuchi et al. | 424/401 |
| 5,571,503 | 11/1996 | Mausner | 424/59 |
| 5,578,312 | 11/1996 | Parrinello | 424/401 |
| 5,595,743 | 1/1997 | Wu | 424/195.1 |
| 5,618,521 | 4/1997 | de Rigal et al. | 424/59 |
| 5,643,587 | 7/1997 | Scancarella et al. | 424/401 |
| 5,663,160 | 9/1997 | Meybeck et al. | 514/182 |
| 5,665,365 | 9/1997 | Bombardelli et al. | 424/401 |
| 5,676,956 | 10/1997 | Duffy et al. | 424/401 |
| 5,676,958 | 10/1997 | Emerson et al. | 424/405 |
| 5,720,962 | 2/1998 | Ivy et al. | 424/401 |
| 5,736,584 | 4/1998 | Kunkel | 514/919 |
| 5,738,887 | 4/1998 | Wu | 426/51 |
| 5,744,187 | 4/1998 | Gaynor | 426/599 |
| 5,747,462 | 5/1998 | Fuentes | 514/23 |
| 5,773,014 | 6/1998 | Perrier et al. | 424/401 |
| 5,817,299 | 10/1998 | Manirazman | 424/59 |
| 5,834,044 | 11/1998 | Schmitz et al. | 426/73 |
| 5,840,309 | 11/1998 | Herstein et al. | 424/195.1 |

FOREIGN PATENT DOCUMENTS

| | | |
|---|---|---|
| 1090 988 | 8/1984 | (CH) . |
| 1 076 624 | 9/1993 | (CH) . |
| 1 090988 | 8/1994 | (CH) . |
| 1 211 403 | 3/1999 | (CH) . |
| 1048799 | 1/1991 | (CN) . |
| 1076623 | 9/1993 | (CN) . |
| 1076624 | 9/1993 | (CN) . |
| 1097618 | 1/1995 | (CN) . |
| 1103779 | 6/1995 | (CN) . |
| 1114872 | 1/1996 | (CN) . |
| 1120410 | 4/1996 | (CN) . |
| 1125052 | 6/1996 | (CN) . |
| 1133142 | 10/1996 | (CN) . |
| 27 03 189 | 1/1977 | (DE) . |
| 2703189 | 8/1978 | (DE) . |
| 4331252 | 5/1994 | (DE) . |
| 2659014 | 9/1991 | (FR) . |
| 51-115968 | 10/1976 | (JP) . |
| 52-120154 | 10/1977 | (JP) . |
| 80022076 | 6/1980 | (JP) . |
| 58-067151 | 4/1983 | (JP) . |
| 58-67151 | 4/1983 | (JP) . |
| 59-227244 | 12/1984 | (JP) . |
| 61-085324 | 4/1986 | (JP) . |
| 61-092530 | 5/1986 | (JP) . |
| 63-116669 | 5/1988 | (JP) . |
| 63-192705 | 8/1988 | (JP) . |
| 5-310527 | 11/1993 | (JP) . |
| 6-271452 | 9/1994 | (JP) . |
| 7-157977 | 10/1995 | (JP) . |
| 7-267977 | 10/1995 | (JP) . |
| 8-332028 | 12/1996 | (JP) . |
| 8-333260 | 12/1996 | (JP) . |
| 61-85324 | 9/1997 | (JP) . |
| 9-249576 | 9/1997 | (JP) . |
| 97 032503 | 7/1996 | (KR) . |
| 97 032 503 | 3/1998 | (KR) . |
| 144830 | 2/1975 | (NL) . |
| 2 041 218 | 5/1994 | (SN) . |
| 93/11779 | 12/1992 | (WO) . |
| 9507681 | 3/1995 | (WO) . |
| WO 96 27383 | 9/1996 | (WO) . |
| 6 000 062 | 3/1966 | (ZA) . |
| 9304523 | 4/1994 | (ZA) . |

OTHER PUBLICATIONS

English language abstract for Chinese Patent No. 1125052, listed above.

(List continued on next page.)

Primary Examiner—Helen Pratt
(74) Attorney, Agent, or Firm—Kirton & McConkie; Dale E. Hulse; Berne S. Broadbent

(57) ABSTRACT

The present invention relates to novel compositions of freeze-dried ginseng berry and other natural health promoting ingredients in a mixture suitable for making tea. The compositions and methods of preferred embodiments of the present invention provide a natural vitamin containing composition for making a tea beverage which can be consumed hot or cold and which provides the consumer with a refreshing, delicious, stimulating and healthful experience.

22 Claims, No Drawings

OTHER PUBLICATIONS

English language abstract for Chinese Patent No. 1120410, listed above.
English language abstract for Chinese Patent No. 1076624, listed above.
English language abstract for Chinese Patent No. 1076623, listed above.
English language abstract for Chinese Patent No. 1048799, listed above.
English language abstract for Japanese Patent 5310527, listed above.
English language abstract for Japanese Patent No. 6271452, listed above.
English language abstract for Japanese Patent No. 8332028, listed above.
English language abstract for Japanese Patent No. 63192705, listed above.
English language abstract for Japanese Patent No. 61092530, listed above.
English language abstract for Japanese Patent No. 59227244, listed above.
English language abstract for Japanese Patent No. 58067151, listed above.
English language abstract for Chinese Patent No. 1133142, listed above.
English language abstract for Chinese Patent No. 1114872, listed above.
English language abstract for Chinese Patent No. 1103779, listed above.
English language abstract for Chinese Patent No. 1097618, listed above.
English language abstract for Japanese Patent No. 8333260, listed above.
English language abstract for German Patent No. DE 4331252, listed above.
English language abstract for French Patent No. 2659014, listed above.
English language abstract for German Patent No. 2703189, listed above.
English language abstract for Japanese Patent No. 52120154, listed above.
English language abstract for Japanese Patent No. 80022076, listed above.
English language abstract for Japanese Patent No. 51115968, listed above.
English language abstract for Netherlands Patent No. 144830, listed above.

FREEZE-DRIED GINSENG BERRY TEA

RELATED APPLICATIONS

This application is a continuation-in-part of our co-pending applications—Ser. No. 09/298,806, filed on Apr. 23, 1999 for Ginseng Berry Drink and Food Compositions, Ser. No. 09/298,807, filed on Apr. 23, 1999 for Cactus Fruit Drink and Food Products, Ser. No. 09/298,701, filed on Apr. 23, 1999 for Ginseng Berry Powder Dietary Supplements, and Ser. No. 09/298,703, filed on Apr. 23, 1999 for Cactus Fruit Powder Dietary Supplements all of which are hereby incorporated by reference.

FIELD OF THE INVENTION

The present invention relates generally to the field of botanical and nutritional food products and more particularly to botanical teas comprising ginseng berry ingredients. Preferred embodiments of the present invention comprise novel compositions of freeze-dried ginseng berry and other beneficial ingredients prepared for human consumption.

BACKGROUND

The human physiological need for vitamins has been well established. Regular dietary consumption of vitamins is essential to good health. Various organizations and government agencies have published recommended quantities for vitamin consumption. One well known standard in the United States is the U.S. Recommended Daily Allowance (RDA) which recommends quantities for the daily intake of vitamins.

While the need for vitamins is well known, the average person fails to consume the recommended daily intake of vitamins through their normal diet. Often this is due to a busy work schedule that encourages the consumption of "fast food" that is high in fat and sugar content. For others, food rich in vitamin content may just not be readily available. Whatever the reason, many people do not consume enough vitamins in their daily diet.

Vitamin supplements have become common and are distributed in a variety of forms. Pills, capsules, elixirs, tablets, powders and other forms abound on the market as a means for obtaining a proper daily vitamin intake. For some, this is an acceptable source of vitamins, however, many people cannot consume vitamins in these forms. Children and the elderly are especially averse to consumption of these products. This may be due to sensitive gag reflexes or a strong distaste for the product's form or taste. Regardless of the reason, many people find concentrated vitamin supplements unpalatable and unacceptable as a source of daily vitamin intake.

Flavored drinks, especially fruit juice and fruit flavored drinks are a common source of refreshment and nutrition. Many fruit drinks contain naturally occurring vitamins. Others may be vitamin enriched through the addition of vitamin supplements. However, the addition of large amounts of vitamin supplements can adversely affect the taste and mouth feel of a drink. The addition of vitamin supplements can cause a metallic taste, a fish-like taste and distinctly non-fruit-like aromas. These are obviously unpalatable and undesirable in a fruit juice or flavored beverage product.

Common fruit drinks with high vitamin content are often highly acidic. For example, citrus fruits often have very high acidity. For those with sensitive stomachs and digestive tracts, this acidity can cause an upset stomach and aggravate existing problems such as ulcers and stomach reflux, thereby precluding consumption of those juices. Fruit juices with high vitamin content, but less acidity, are preferred by these consumers.

Natural foods are popular among health-conscious consumers today. Many people prefer to get their vitamins and other nutrients in a "natural" way from naturally occurring sources. "Natural" vitamins are now in high demand. These are vitamins which are found in a product in its natural state without vitamin supplements or vitamin "fortification." Many fruit and vegetable juices are known to have high concentrations of vitamins in their natural state and are often a preferred source of vitamins.

Among these natural vitamin containing juices, the health-conscious consumer often prefers a flavor which is unique or exotic and mildly sweet. This gives the perception of a healthy substance that is not high in calories. Unique and exotic tastes are often preferred and perceived to be more refreshing so long as they can be associated with a natural fruit, vegetable, herb or other natural source.

The majority of Americans, and people of many other cultures, are accustomed to consuming stimulants as a part of their daily routine. In the United States, the stimulant of choice is currently caffeine. Millions of cups of coffee are imbibed each morning to kick-start the day and throughout the day to provide a pick-me-up in the afternoon or evening. Cola drinks are also a source of caffeine which are consumed in large amounts. Other cultures prefer tea as a source of caffeine stimulant. The addictive nature of caffeine may explain its widespread acceptance and enormous consumption rate. Caffeine-containing drinks continue to be popular despite effects that arc detrimental to the body. Caffeine can be detrimental to the digestive tract as well as other systems. Caffeine's addictive effects and a user's psychological dependence on caffeine's stimulation make it difficult to abandon after continued use. An alternative drink which can provide gentle stimulation would be a welcome alternative to caffeine-containing drinks.

Herbal teas can be a source of caffeine-free stimulation and a source of vitamins and nutrients, however, prior art teas have demonstrated a difficulty in preserving the rich flavor of fruits in a dehydrated product. Often the flavor of a fruit is lost or substantially diminished when fruit products are converted to a dehydrated tea.

Freeze-drying is a process by which water in a fruit or other product is removed by sublimation at a low temperature and pressure. Freeze-drying is known to help retain nutrients in a product that is dehydrated. While freeze-drying may help preserve nutrients and some flavor, a significant amount of flavor is still lost in the process.

SUMMARY AND OBJECTS OF THE INVENTION

Preferred embodiments of the present invention provide a completely natural, natural-tasting, refreshing tea beverage which contains many essential vitamins, minerals and amino acids as well as the benefits of selected herbs and royal jelly. An unique or exotic flavor is also provided through the use of ginseng berry ingredients. Preferred embodiments of the present invention comprise freeze-dried ginseng berry which may be combined with other herbal ingredients to form a vitamin containing tea beverage which, depending on the ingredients of the specific embodiment, may provide mental and physical stimulation and other health benefits.

The teas of the present invention may be consumed in either cold or hot form and may be packaged by several known techniques. Preferred embodiments of the present invention comprise whole freeze-dried ginseng berries combined with natural herbs and are preferably packaged in tea bag form for convenient use. These same embodiments may also be dispensed in a tea ball or by other means that segregates the tea solids from the drink to be consumed. Some consumers may also prefer to mix the ingredients in their tea and directly consume the reconstituted or partially reconstituted ginseng berries with their tea.

Accordingly, it is an object of preferred embodiments of the present invention to provide a tea beverage with a unique or exotic flavor.

It is another object of preferred embodiments of the present invention to provide a tea beverage comprised of natural fruit ingredients with naturally occurring vitamins.

It is an additional object of preferred embodiments of the present invention to provide a source of vitamins, amino acids, minerals, herbs and/or other nutrients for those who are averse to consuming tablets, capsules and similar items.

A further object of preferred embodiments of the present invention is to provide a source of vitamins, amino acids, minerals, herbs and/or other nutrients that can be easily consumed in the office or on a business trip or vacation.

An additional object of preferred embodiments of the present invention is to provide a tea beverage that will naturally stimulate the mind and body.

A once further object of preferred embodiments of the present invention is to provide a naturally vitamin rich tea beverage that will not upset a sensitive stomach.

Another object of preferred embodiments of the present invention is to provide a naturally vitamin rich tea beverage that has lower acidity than common citrus fruit juices.

Yet another object of preferred embodiments of the present invention is to provide a naturally vitamin-rich tea beverage with no artificial sweeteners.

An additional object of preferred embodiments of the present invention is to provide a naturally vitamin-rich tea beverage with no preservatives.

Another object of preferred embodiments of the present invention is to provide an alternative to caffeine-containing beverages which can stimulate the consumer without the addictive or health-repressing qualities of caffeine.

Another object of preferred embodiments of the present invention is provide a natural source of vitamins and herbal ingredients that can be packaged in a tea bag.

DETAILED DESCRIPTION OF THE PREFERRED EMBODIMENTS

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The present invention is directed towards a tea beverage containing ingredients from the ginseng berry. Although the ginseng root is sometimes used as an herbal supplement, the ginseng berry has been overlooked as a food product or medication due, at least partially, to its high seed content. Ginseng berries contain a large number of seeds which make up a large percentage of the berry's volume. These seeds must be removed in order to make a palatable beverage.

Laboratory analysis of ginseng berries reveals the presence of natural and essential vitamins. The following Table 1 gives the result of a laboratory analysis of the essential vitamins and ingredients found in the ginseng berry.

TABLE 1

| Riboflavin | 171.9 ug/gram of product |
|---|---|
| Vitamin A | 109 IU |
| Vitamin E | 1.5 IU |
| Beta Carotene | 16.9 IU |

Advantageously, ginseng berry juice also acts as an antioxidant. Laboratory analysis reveals that one gram of ginseng berry contains 1.4 times more antioxidant that 10 mg. of Vitamin C.

Consumption of natural herb products may also increase health and vitality. The effects of various herbs and plant products are beneficial to the nervous, digestive and circulatory systems as well as other physiological functions. Herbs which, when consumed, are beneficial to one's health and vitality may be considered to be "health promoting agents." The combination of herbal ingredients with vitamin rich ginseng berry offers the health advantages of natural vitamins and herbs in a palatable, easy-to-consume drink.

Ginseng root also has beneficial physiological effects. It is believed to help regulate blood pressure and increase the body's resistance to adverse physical, chemical and biological influences. Ginseng root can stimulate physical and mental activity and protect against the adverse effects of mental and physical stress. It may also improve concentration and stimulate brain cells. Ginseng root may be considered to be a natural health promoting agent. In the prior art, like some vitamins, ginseng root is often offered in capsules or tablets in a raw form. Again, this can be difficult for some to consume.

Royal jelly is a natural substance produced by worker bees as a food source for the queen bee, and has beneficial physiological effects when consumed by humans as well. It contains vitamins A, C, E and numerous B vitamins. It also contains minerals and many amino acids necessary for the body. Royal jelly is believed to increase vitality and longevity in humans. Royal jelly may also be considered a natural health promoting agent. In the prior art, royal jelly is also distributed in capsule form making it unpalatable to those averse to capsules.

In the production of a preferred embodiment of the present invention, ginseng berries are preferably harvested in the first or second week of September when the berries are the ripest. The berries are then washed and cleaned and put through a freeze-drying process.

At the operating vacuum pressure of the freeze-drying process water cannot exist as a liquid. It exists as ice or vapor and sublimates directly from ice to vapor. As temperatures are increased at a controlled rate the water in the ginseng berries sublimates directly to vapor as it leaves the fruit. Refrigeration panels within the freeze-drying chamber operate at a temperature around −25 degrees Fahrenheit. As vapor is forced off the fruit by increasing temperatures, the vapor is drawn toward the colder refrigeration panels where it is converted back to solid form through deposition. A balanced sublimation-deposition process maintains proper vacuum in the chamber.

Careful control of pressure and temperature are essential to the freeze-drying process. If temperatures are increased too quickly, the refrigeration panels may not keep up with the vapor-generating sublimation process and pressure in the chamber may raise thereby allowing liquid water to form in the product. This can be avoided by carefully controlling the rate of temperature increase.

Once the ginseng berries have been properly freeze-dried, they can be further processed with other ingredients to enhance their beneficial value or they may be packaged directly for use in making tea.

In preferred embodiments of the present invention the freeze-dried ginseng berries are further processed by coating methods and other combination techniques to enhance their nutritional value and improve or vary their taste. A surficial coating over the ginseng berry has been found to improve flavor retention of the berry itself as well as enhance that flavor with the flavor of the coating product. A cactus fruit coating has been found to have superior flavor preservation characteristics and provides a tasteful and exotic flavor. However, other fruit-based coatings have been found to work well too.

A preferred embodiment of the present invention comprises a cactus fruit extract. A preferred genus of cactus is the Cereus genus with several preferable species such as *Cereus grandiflorus, Cereus giganteus* and *Cereus thurberi*. Another preferred genus is the Opuntia which includes many preferred species including *Opuntia strigil, Opuntia basilaris, Opuntia rufida, Opuntia phaeacantha, Opuntia engelmannii, Opuntia erinacea, Opuntia humifusa, Opuntia phaecantha, Opuntia chlorotica, Opuntia polycantha, Opuntia violacea, Opuntia spinosbacca, Opuntia lindheimeri* and *Opuntia macrorhiza*. The species within the Opuntia genus of cactus have relatively flat, oval-shaped pads, similar to the leaves or branches of a bush, which may or may not have spines thereon. Cactus fruit or "pears" generally grow around the perimeter of the oval-shaped pads on these cacti. In the practice of the present invention, extract is derived from the cactus fruit. In some presently preferred embodiments, extracts may also be derived from the cactus pads or stems.

Cactus fruit grow in several varieties with varying color, seed content, sugar content and size. Colors range from green and yellow to purple, orange and red. Fruits generally range in size from 110 grams to 150 grams. Seed content, by weight, typically ranges between 2 and 4 grams per fruit while sugar content generally ranges between 11% and 16%. Cactus fruit used in a preferred embodiment of the process and product of the present invention are red with average to high sugar content obtained from the *Cereus grandiflorus* species.

Laboratory analysis of the extract from cactus fruit used for the preferred embodiment of the beverage of the present invention shows a high concentration of essential vitamins. The following Table 2 gives the result of a laboratory analysis of the cactus juice squeezed from the *Cereus grandiflorus* cactus used in a preferred embodiment of the present invention.

TABLE 2

| | |
|---|---|
| Thiamin | 116.6 ug/gram of product |
| Riboflavin | 221.9 ug/gram of product |
| Vitamin C | 8.35 mg/gram of product |
| Vitamin A | 309 IU |
| Vitamin E | 1.36 IU |
| Vitamin D3 | 120 IU |
| Beta Carotene | 16.6 IU |
| Cyanocobalamine B12 | 91 mg/gram of product |

Cactus fruit extract has also been found to be an effective anti-oxidant. Laboratory analysis reveals that one gram of cactus fruit contains 7 times more antioxidant that 10 mg of Vitamin C. The results of these tests prove that cactus fruit juice is an excellent source of vitamins.

In one preferred method of enhancing the freeze-dried ginseng berries, a liquid coating is applied to the freeze-dried berries. This may take place immediately after freeze-drying or at a later time. Several techniques may be used to accomplish this step. The berries may be kept frozen or may be refrozen at which point the berries are sprayed with a solution which freezes on the surface of the berries. This solution may then be freeze-dried on the berry where it will remain as a coating. Another technique for applying a coating to the freeze-dried ginseng berries involves a dehydration process wherein the freeze-dried berries may be frozen or may be allowed to thaw. A solution is then sprayed onto the berries after which the berries and their coating solution are dehydrated thereby forming a solid coating on the berries. Dehydration of the coating may be by a freeze-drying process or other dehydration methods.

The dehydration process may incorporate a number of known methods, however, a preferred process utilizes a conveyor belt which passes through an oven. The berries are sprayed as they pass along the conveyor belt and are immediately transported along the belt to the oven where the coating is dehydrated to a substantially solid coating which will adhere and remain on the berries.

In an alternative process, the berries may be sprayed with a wetting solution which may consist of water alone, water with additives or some other solution. Once wetted, the berries are coated with a powder supplement which adheres to the berries by virtue of the wetting solution or the combination of wetting solution and powder. Powder coating may be achieved using any of several known techniques including, but not limited to, dusting and immersion in powder. The powder-coated berries may then be oven-dried, freeze-dried or air-dried as required for preservation and packaging.

In addition to coating the whole, freeze-dried ginseng berries, additional ingredients may be added to the resulting tea beverage by mixture in the tea bag or other packaging. Various herbs and other ingredients may be combined with the ginseng berries to improve health benefits, flavor or other aspects. These ingredients may be added as part of a coating coating solution, coating powder or mixed in packaging such as a tea bag.

When an instant tea is preferred, the freeze-dried ginseng berries of the present invention may be ground to a powder form along with other ingredients so that it may more readily dissolve. This powder may be packaged in tea bag form or it may be directly mixed and dissolved into a tea beverage.

A generalized formula for the tea beverage of the present invention comprises ginseng berry combined with fruit extract and/or one or more natural health promoting ingredients. Natural health promoting ingredients may include, for example and not by way of limitation, agnus castus (*Vitex agnus-castus*), agrimony (*Agrimonia eupatoria*), anise (*Pimpinella anisum*), arjuna (*Terminalia arjuna*), arnica (*Arnica montana*), asafoetida (*Ferula assa-foetida*), astragalus (*Astragalus membranaceus*), avens (*Geum urbanum*), bay laurel (*Laurus nobilis*), Beleric myrobalan (*Terminalia belerica*), betony (*Stachys officinalis*), bilberry (*Vaccinium myritillus*), bistort (*Polygonum bistorta*), black cohosh (*Cimicifuga racemosa*), blackcurrant (*Ribes nigrum*), black haw (*Viburnum prunifolium*), bogbean (*Menyanthes trifoliata*), boldo (*Peumus boldus*), boneset (*Eupatorium perfoliatum*), buchu (*Barosma betulina*), bugleweed (*Lycopus virginicus*), burdock (*Arctium lappa*), calendula (*Calendula officinalis*), calumba (*Jateorhiza palmata*), cardamom (*Eletteria cardamomum*), cayenne (Capsicum frutescens), cerasee (Momordica charantia), chiretta (Swertia chirata), cinchona (cinchona), cinnamon (Cinnamomum verum), clove (Eugenia caryophyllata), codonopsis (Codonopsis pilosula), coltsfoot (Tussilago farfara), comfrey (Symphytum officinale), common plantain (Plantago major), cornsilk (Zea mays), cowslip (Primula veris), crampbark (Viburnum opulus), damiana (Turnera diffusa), dandelion (Taraxacum officinale), devil's claw (Harpagophytum procumbens), echinacea (Echinacea spp.), eggplant (Solanum melongena), elder (Sambucus nigra), elecampane (Inula helenium), ephedra (Ephedra sinica), eucalyptus (Eucalyptus globulus), evodia (Evodia rutaecarpa), evening primrose (Oenothera biennis), eyebright (euphrasia spp.), fennel (Foeniculum vulgare), fumitory (Fumaria officinalis), galangal (Alpinia officinarum), garlic (Allium sativum), gentian (Gentiana lutea), ginger (Zingiber officinale), ginkgo (Ginkgo biloba), goat's rue (Galega officinalis), goldenrod (Solidago vigaurea), hanbane (Hyoscyamus niger), hops (Humulus lupulus), horsemint (Monarda punctata), Indian gooseberry (Emblica officinalis), jamaica dogwood (Piscidia erythrina), java tea (Orthosiphon aristata), jujube (Ziziphus jujuba), kantakari (Solanum xanthocarpum), lavender (Lavandula officinalis), lapacho (Tabebuia spp.), lemon (Citrus limon), lemon balm (Melissa officinalis), licorice (Glycyrrhiza glabra), linden (tilia), lobelia (Lobelia inflata), lycium (Lycium chinense), manioc (Manihot esculenta), meadowsweet (Filipendula ulmaria), milk thistle (Carduus marianus), Muira puama (Liriosma ovata), mullein (Verbascum thapsus), myrrh (Commiphora molmol), nettle (Uritica dioica), oats (Avena sativa), passionflower (Passiflora incarnata), patchouli (Pogostemon cablin), picrorrhiza (Picrorrhiza kurroa), prickly ash (Zanthoxylum americanum), purslane (Protulaca oleracea), rehmannia (Rehmannia glutinosa), rosemary (Rosmarinus officinalis), sarsaparilla (smilax spp.), schisandra (Schisandra chinensis), skullcap (Scutellaria lateriflora), slippery elm (Ulmus rubra), soapwort (Saponaria officinalis), spiny restharrow (Ononis spinosa), squaw vine (Mitchella repens), sweet basil (Ocimum basilicum), tea tree (Melaleuca alternifolia), tree lungwort (Lobaria pulmonaria), turmeric (Curcuma longa), thyme (Thymus vulgaris), vervain (Verbena officinalis), white willow (Salix alba), winter cherry (Physalis alkekengi), withania (Withania somnifera), wormwood (Artemisia absinthium), yarrow (Achillea millefolium), yellow dock (Rumex crispus) as well as vitamins, minerals and amino acids. The forrnula may also contain other ingredients to promote health or adjust flavor.

Other ingredients, given by way of example and not by limitation may be sweeteners, flavorings, or preservatives. Natural fruit flavorings found to be especially palatable are raspberry, strawberry, pineapple, apple, lemon, orange and citrus flavors. Other natural flavors found to be preferable are mint leaf, peppermint and cinnamon. Other tea leaves, especially ginseng leaf can be combined with ginseng berry to make a refreshing and revitalizing beverage. The formula may also contain ingredients from other fruits, vegetables or herbs to provide vitamins or other health promoting ingredients or simply to adjust flavor or provide a variety of flavors. Fruit ingredients found to be desirable, especially by those with sensitive digestive tracts, are passion fruit, mango, guava and melons. However, citrus fruit ingredients and ingredients from other tropical fruits may be equally palatable and nutritious. A preferred embodiment of the present invention comprises extracts of cactus fruit juice.

The above mentioned ingredients other than the freeze-dried ginseng berry may be mixed into a solution for application to the freeze-dried ginseng berry mixed in a powder for coating or may be mixed in the packaging of the present invention.

One presently preferred embodiment of the present invention comprises the following ingredients in the ranges of amounts indicated by weight percentage:

| | |
|---|---|
| ginseng berry | about 15%–60% |
| fruit juice | about 0%–20% |
| herbal ingredients | about 0%–30% |
| natural sweetener | about 0%–15% |
| natural flavoring | about 0%–10% |
| royal jelly | about 0%–8% |
| preservative | about 0%–2% |

Another presently preferred embodiment of the present invention comprises the following ingredients in the ranges of amounts indicated by weight percentage:

| | |
|---|---|
| ginseng berry | about 15%–75% |
| cactus fruit juice | about 0%–30% |
| ginseng (root) | about 0%–15% |
| wild honey | about 0%–15% |
| royal jelly | about 0%–8% |

Yet another presently preferred embodiment of the present invention comprises the following ingredients in the amounts indicated by weight percentage:

| | |
|---|---|
| ginseng berry | about 15%–75% |
| sorbitol | about 0%–15% |
| honey | about 0%–15% |
| royal jelly | about 0%–8% |
| sodium benzoate | about >0.1% |

EXAMPLE 1

A tea beverage within the scope of the present invention is prepared by using the following ingredients in amounts given by weight percentage:

| | |
|---|---|
| Whole freeze-dried ginseng berry | about 70% |
| Cactus juice extract (coating) | about 15% |
| Wild Honey | about 10% |
| Royal Jelly | about 5% |

The cactus juice, honey and royal jelly coating is applied by spraying and oven drying.

EXAMPLE 2

A tea beverage within the scope of the present invention is prepared by using the following ingredients in amounts given by weight percentage:

| | |
|---|---|
| Whole freeze-dried ginseng berry | about 55% |
| American ginseng root extract | about 10% |
| Passion fruit extract | about 20% |
| honey | about 15% |
| sodium benzoate | about <0.1% |

EXAMPLE 3

A tea beverage within the scope of the present invention is prepared by using the following ingredients in amounts given by weight percentage:

| Whole freeze-dried ginseng berry | about 55% |
| --- | --- |
| American ginseng root extract | about 10% |
| Strawberry extract | about 20% |
| Ginseng leaf | about 10% |
| Dehydrated mint leaf | about 5% |

EXAMPLE 4

A tea beverage within the scope of the present invention is prepared by using the following ingredients in amounts given by weight percentage:

| Whole freeze-dried ginseng berry | about 55% |
| --- | --- |
| Ginseng berry extract | about 15% |
| Raspberry extract | about 20% |
| Ginseng root extract | about 5% |
| Dehydrated mint leaf | about 5% |

EXAMPLE 5

A tea beverage within the scope of the present invention is prepared by using the following ingredients in amounts given by weight percentage:

| Ground freeze-dried ginseng berry | about 60% |
| --- | --- |
| Ground ginseng root | about 15% |
| Ground Freeze-dried apple | about 20% |
| Dehydrated mint leaf | about 5% |

The above formulas provide a natural, vitamin rich, herbally enhanced and/or royal jelly fortified tea beverage with a unique and exotic taste which can be consumed by those who are tablet and capsule averse and which can be packaged so as to make it convenient for consumers of almost any lifestyle. Preferred embodiments also provide a gentle herbal stimulant which can be used as a healthier alternative to caffeine.

What is claimed is:

1. A composition for making tea comprising:
   freeze-dried ginseng berries; and,
   one or more natural health promoting ingredients.

2. The composition of claim 1 wherein said one or more natural health promoting ingredients comprises cactus fruit or cactus fruit extract.

3. The composition of claim 1 wherein said one or more natural health promoting ingredients comprises an herb.

4. The composition of claim 1 wherein said one or more natural health promoting ingredients comprises ginseng root.

5. The composition of claim 1 wherein said one or more natural health promoting ingredients comprises royal jelly.

6. The composition of claim 1 wherein said one or more natural health promoting ingredients comprises an ingredient selected from the group consisting of *agnus castus* (*Vitex agnus-castus*), agrimony (*Agrimonia eupatoria*), anise (*Pimpinella anisum*), arjuna (*Terminalia arjuna*), arnica (*Arnica montana*), asafoetida (*Ferula assa-foetida*), astragalus (*Astragalus menmbranaceus*), avens (*Geum urbanum*), bay laurel (*Laurus nobilis*), Beleric myrobalan (*Terminalia belerica*), betony (*Stachys officinalis*), bilberry (*Vaccinium myritillus*), bistort (*Polygonum bistorta*), black cohosh (*Cimicifuga racemosa*), blackcurrant (*Ribes nigrum*), black haw (*Viburnum prunifolium*), bogbean (*Menyanthes trifoliata*), boldo (*Peumus boldus*), boneset (*Eupatorium perfoliatum*), buchu (*Barosma betulina*), bugleweed (*Lycopus virginicus*), burdock (*Arctium lappa*), calendula (*Calendula officinalis*), calumba (*Jateorhiza palmata*), cardamom (*Eletteria cardamomum*), cayenne (*Capsicum frutescens*), cerasee (*Momordica charantia*), chiretta (*Swertia chirata*), cinchona (cinchona), cinnamon (*Cinnamomum verum*), clove (*Eugenia caryophyllata*), codonopsis (*Codonopsis pilosula*), coltsfoot (*Tussilago farfara*), comfrey (*Symphytum officinale*), common plantain (*Plantago major*), cornsilk (*Zea mays*), cowslip (*Primula veris*), crampbark (*Viburnum opulus*), damiana (*Turnera diffusa*), dandelion (*Taraxacum officinale*), devil's claw (*Harpagophytum procumbens*), echinacea (Echinacea spp), eggplant (*Solanum melongena*), elder (*Sambucus nigra*), elecampane (*Inula helenium*), ephedra (*Ephedra sinica*), eucalyptus (*Eucalyptus globulus*), evodia (*Evodia rutaecarpa*), evening primrose (*Oenothera biennis*), eyebright (euphrasia spp.), fennel (*Foeniculum vulgare*), fumitory (*Fumaria officinalis*), galangal (*Alpinia officinarum*), garlic (*Allium sativum*), gentian (*Gentiana lutea*), ginger (*Zingiber officinale*), ginkgo (*Ginkgo biloba*), goat's rue (*Galega officinalis*), goldenrod (*Solidago vigaurea*), hanbane (*Hyoscyamus niger*), hops (*Humulus lupulus*), horsemint (*Monarda punctata*), Indian gooseberry (*Emblica officinalis*), jamaica dogwood (*Piscidia erythrina*), java tea (*Orthosiphon aristata*), jujube (*Ziziphus jujuba*), kantakari (*Solanum xanthocarpum*), lavender (*Lavandula officinalis*), lapacho (tabebuia spp.), lemon (*Citrus limon*), lemon balm (*Melissa officinalis*), licorice (*Glycyrrthiza glabra*), linden (tilia), lobelia (*Lobelia inflata*), lycium (*Lycium chinense*), manioc (*Manihot esculenta*), meadowsweet (*Filipendula ulmaria*), milk thistle (*Carduus marianus*), Muira puama (*Liriosma ovata*), mullein (*Verbascum thapsus*), myrrh (*Commiphora molmol*), nettle (*Uritica dioica*), oats (*Avena sativa*), passionflower (*Passiflora incarnata*), patchouli (*Pogostemon cablin*), picrorrhiza (*Picrorrhiza kurroa*), prickly ash (*Zanthoxylum americanum*), purslane (protulaca oleracea), rehmannia (*Rehmannia glutinosa*), rosemary (*Rosmarinus officinalis*), sarsaparilla (smilax spp.), schisandra (*Schisandra chinensis*), skullcap (*Scutellaria lateriflora*), slippery elm (*Ulmus rubra*), soapwort (*Saponaria officinalis*), spiny restharrow (*Ononis spinosa*), squaw vine (*Mitchella repens*), sweet basil (*Ocimum basilicum*), tea tree (*Melaleuca alternifolia*), tree lungwort (*Lobaria pulmonaria*), turmeric (*Curcuma longa*), thyme (*Thymus vulgaris*), vervain (*Verbena officinalis*), white willow (*Salix alba*), winter cherry (*Physalis alkekengi*), withania (*Withania somnifera*), wormwood (*Artemisia absinthium*), yarrow (*Achillea millefolium*), and yellow dock (*Rumex crispus*).

7. The composition of claim 1 further comprising a fruit extract.

8. The composition of claim 1 further comprising a natural fragrance.

9. The composition of claim 1 further comprising an aromatic spice.

10. A composition for making tea comprising:
    whole freeze-dried ginseng berries; and,
    a coating on said berries comprising one or more natural health promoting ingredients.

11. The composition of claim 10 wherein said one or more natural health promoting ingredients comprises cactus fruit or cactus fruit extract.

12. The composition of claim 10 wherein said one or more natural health promoting ingredients comprises an herb.

13. The composition of claim 10 wherein said one or more natural health promoting ingredients comprises ginseng root.

14. The composition of claim 10 wherein said one or more natural health promoting ingredients comprises royal jelly.

15. The composition of claim 10 wherein said coating comprises a fruit extract.

16. The composition of claim 10 further comprising honey.

17. The composition of claim 10 further comprising a natural fragrance.

18. The composition of claim 10 further comprising a natural flavor.

19. A composition for making tea comprising:
   whole freeze-dried ginseng berries; and,
   a coating on said berries comprising one or more natural health promoting ingredients,
   said coating being applied to said berries by spraying followed by drying.

20. The beverage of claim 19 wherein said coating comprises cactus fruit extract.

21. The beverage of claim 19 wherein said drying is oven drying.

22. The beverage of claim 19 wherein said drying is performed on a hot air conveyor belt.

* * * * *